(12) United States Patent
Denner et al.

(10) Patent No.: US 8,108,474 B2
(45) Date of Patent: Jan. 31, 2012

(54) SYSTEM AND METHOD FOR INDICATION OF IM TRACKING

(75) Inventors: Gary Denner, Celbridge (IE); Sean Callanan, Churchtown (IE); Patrick Joseph O'Sullivan, Ballsbridge (IE); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 12/346,141

(22) Filed: Dec. 30, 2008

(65) Prior Publication Data
US 2010/0169421 A1    Jul. 1, 2010

(51) Int. Cl.
*G06F 15/16* (2006.01)
(52) U.S. Cl. ...................................... 709/206
(58) Field of Classification Search .................... 709/206
See application file for complete search history.

(56) References Cited

U.S. PATENT DOCUMENTS

| | | | |
|---|---|---|---|
| 6,260,148 B1 | 7/2001 | Aggarwal et al. | |
| 6,668,173 B2 | 12/2003 | Greene | |
| 6,714,791 B2 | 3/2004 | Friedman | |
| 6,785,681 B2 | 8/2004 | Keskar et al. | |
| 6,865,268 B1 | 3/2005 | Matthews et al. | |
| 6,920,478 B2 | 7/2005 | Mendiola et al. | |
| 6,938,213 B2 | 8/2005 | Brown et al. | |
| 7,020,480 B2 | 3/2006 | Coskun et al. | |
| 7,080,139 B1 | 7/2006 | Briggs et al. | |
| 7,133,900 B1 | 11/2006 | Szeto | |
| 7,451,190 B2 * | 11/2008 | Szeto | 709/207 |
| 2004/0186886 A1 * | 9/2004 | Galli et al. | 709/206 |
| 2004/0186887 A1 * | 9/2004 | Galli et al. | 709/206 |
| 2006/0059235 A1 * | 3/2006 | Peterson et al. | 709/206 |
| 2006/0129641 A1 * | 6/2006 | Briand et al. | 709/204 |
| 2006/0167991 A1 * | 7/2006 | Heikes et al. | 709/204 |
| 2007/0022157 A1 * | 1/2007 | Daniels et al. | 709/204 |
| 2008/0065755 A1 | 3/2008 | Caspi et al. | |
| 2008/0069331 A1 | 3/2008 | Levy et al. | |
| 2008/0104679 A1 | 5/2008 | Craig | |
| 2008/0114776 A1 | 5/2008 | Sun et al. | |

* cited by examiner

*Primary Examiner* — Firmin Backer
*Assistant Examiner* — Brian P Whipple
(74) *Attorney, Agent, or Firm* — Holland & Knight, LLP; Brian J Colandreo, Esq.; V. Raman Bharatula, Esq.

(57) ABSTRACT

A method and computer program product for processing a tracking request from a first user of an instant messaging system concerning the online status of a second user of the instant messaging system. The online status of the second user is monitored. A tracking notice is provided to the second user. The tracking notice informs the second user that the first user is monitoring the online status of the second user.

16 Claims, 4 Drawing Sheets

SYSTEM AND METHOD FOR INDICATION OF IM TRACKING

TECHNICAL FIELD

This disclosure relates to instant messaging systems and, more particularly, to the indication of tracking within instant messaging systems.

BACKGROUND

Instant messaging provides real-time text based communication between two or more users interacting via computers or mobile devices. The more immediate and direct interaction provided by instant messaging often tends to more closely resemble a conversation, as compared to the more "letter like" format of email. The direct interaction between users may provide highly effective and convenient collaboration.

For example, on a daily basis, instant messaging is used to interact and resolve issues collaboratively within a business environment; and in our personal lives, instant messaging is used to e.g., exchange text and images with friends and family. Instant messaging systems typically include extensive features that e.g., allow a first user to determine if a second user is signs into the instant messaging system, thus allowing the first user to contact the second user as early as possible. Unfortunately, what one user considers to be a feature may be considered an intrusion/annoyance by another user.

SUMMARY OF DISCLOSURE

In a first implementation, a method includes processing a tracking request from a first user of an instant messaging system concerning the online status of a second user of the instant messaging system. The online status of the second user is monitored. A tracking notice is provided to the second user. The tracking notice informs the second user that the first user is monitoring the online status of the second user.

One or more of the following features may be included. Providing a tracking notice to the second user may include providing a tracking notice to the second user prior to the second user logging into the instant messaging system. The second user may be allowed to prohibit the first user from receiving information concerning the online status of the second user. If the second user does not prohibit the first user from receiving information concerning the online status of the second user, the first user may be provided with information concerning the online status of the second user.

The information concerning the online status of the second user may include one or more of: log in notifications; and log out notifications. Monitoring the online status of the second user may include monitoring the online status of the second user for a defined period of time based upon one or more configuration settings.

Processing a tracking request from a first user of an instant messaging system may include determining a first hierarchical rating for the first user and a second hierarchical rating for the second user. Monitoring the online status of the second user may include monitoring the online status of the second user based, at least in part, upon the first and second hierarchical ratings.

A periodic tracking report may be provided to the second user. The periodic tracking report may identify one or more users of the instant messaging system who submitted tracking requests concerning the second user during a defined period of time.

The tracking request may define why the first user is requesting information concerning the online status of the second user. A maximum track count may define the maximum number of users for which the first user may submit a tracking request.

In another implementation, a computer program product resides on a computer readable medium and has a plurality of instructions stored on it. When executed by a processor, the instructions cause the processor to perform operations including processing a tracking request from a first user of an instant messaging system concerning the online status of a second user of the instant messaging system. The online status of the second user is monitored. A tracking notice is provided to the second user. The tracking notice informs the second user that the first user is monitoring the online status of the second user.

One or more of the following features may be included. Providing a tracking notice to the second user may include providing a tracking notice to the second user prior to the second user logging into the instant messaging system. The second user may be allowed to prohibit the first user from receiving information concerning the online status of the second user. If the second user does not prohibit the first user from receiving information concerning the online status of the second user, the first user may be provided with information concerning the online status of the second user.

The information concerning the online status of the second user may include one or more of: log in notifications; and log out notifications. Monitoring the online status of the second user may include monitoring the online status of the second user for a defined period of time based upon one or more configuration settings.

Processing a tracking request from a first user of an instant messaging system may include determining a first hierarchical rating for the first user and a second hierarchical rating for the second user. Monitoring the online status of the second user may include monitoring the online status of the second user based, at least in part, upon the first and second hierarchical ratings.

A periodic tracking report may be provided to the second user. The periodic tracking report may identify one or more users of the instant messaging system who submitted tracking requests concerning the second user during a defined period of time.

The tracking request may define why the first user is requesting information concerning the online status of the second user. A maximum track count may define the maximum number of users for which the first user may submit a tracking request.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
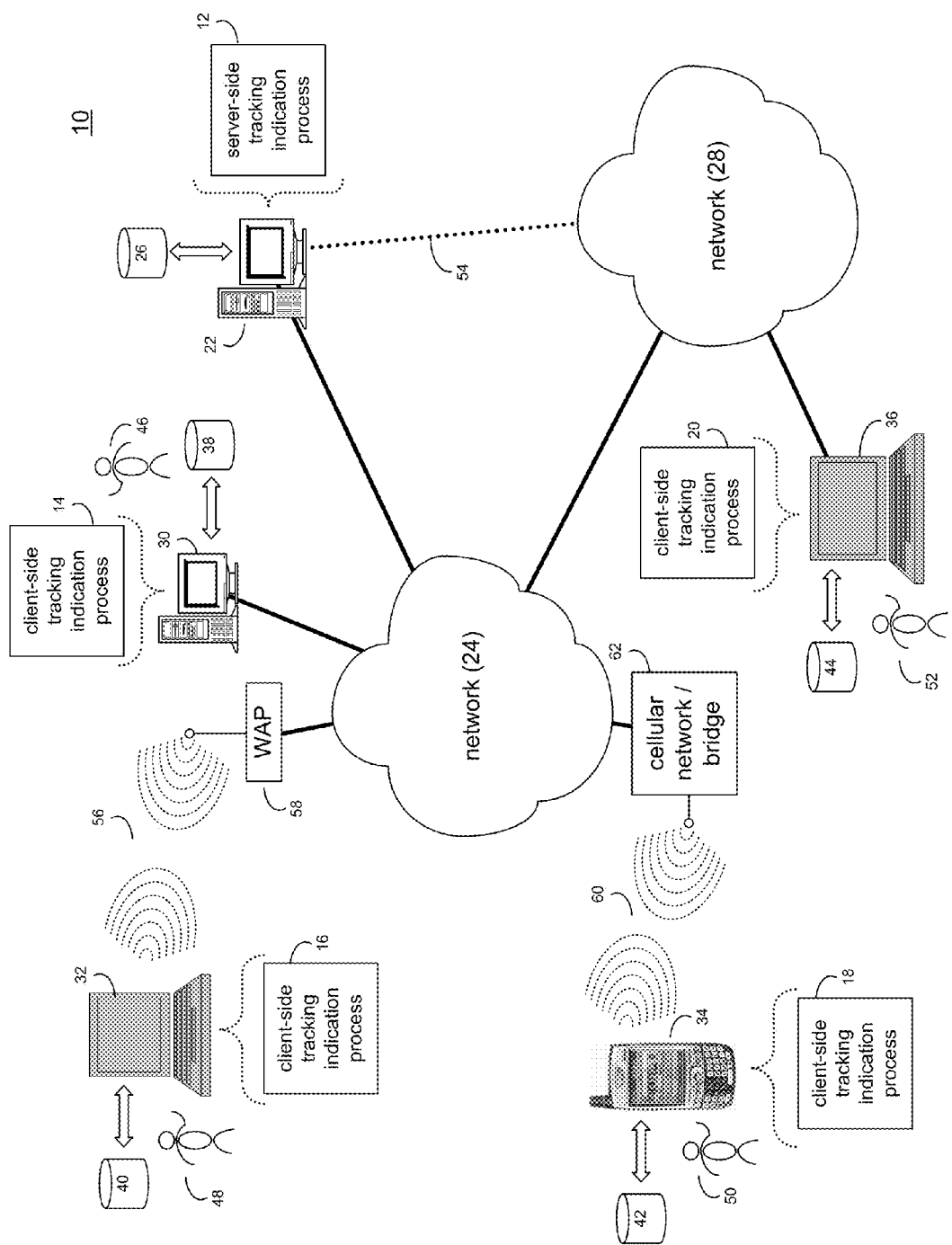
FIG. 1 is a diagrammatic view of a tracking indication process coupled to a distributed computing network.
Figure 2:
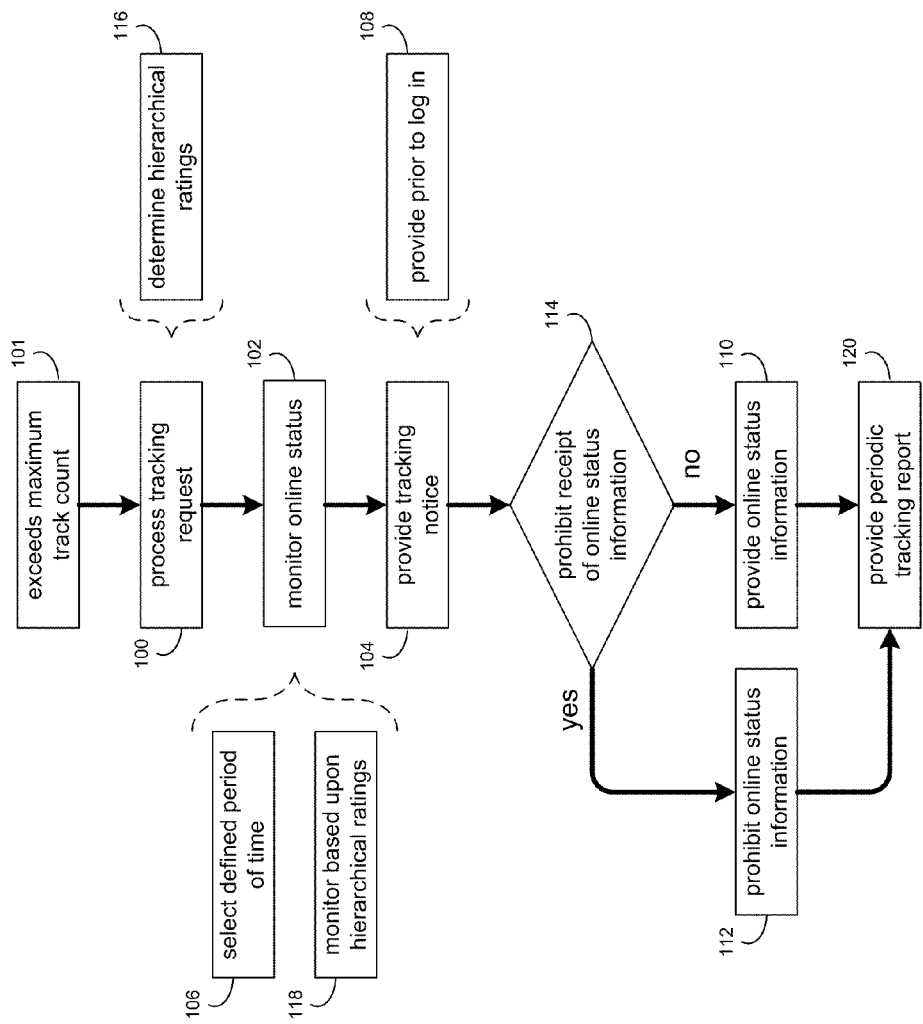
FIG. 2 is a flowchart of the tracking indication process of FIG. 1.

System Overview:

Referring to FIGS. 1 & 2, there is shown a tracking indication process 10. As will be discussed below, tracking indication process 10 may process 100 a tracking request from a first user of an instant messaging system concerning the online status of a second user of the instant messaging system. The online status of the second user may be monitored 102. A tracking notice may be provided 104 to the second user. The tracking notice may inform the second user that the first user is monitoring the online status of the second user.

Tracking indication process 10 may be a server-side process (e.g., server-side tracking indication process 12), a client-side process (e.g., client-side tracking indication process 14, client-side tracking indication process 16, client-side tracking indication process 18, or client-side tracking indication process 20), or a hybrid server-side/client-side process (e.g., the combination of server-side tracking indication process 12 and one or more of client-side tracking indication processes 14, 16, 18, 20). Accordingly and for the following disclosure, tracking indication process 10 shall collectively refer to any and all combinations of server-side tracking indication process 12 and/or client-side tracking indication processes 14, 16, 18, 20.

Server-side tracking indication process 12 may reside on and may be executed by server computer 22, which may be connected to network 24 (e.g., the Internet or a local area network). Examples of server computer 22 may include, but are not limited to: a personal computer, a server computer, a series of server computers, a mini computer, and a mainframe computer. Server computer 22 may be a web server (or a series of servers) running a network operating system, examples of which may include but are not limited to: Microsoft Windows XP Server™; Novell Netware™; or Redhat Linux™, for example.

The instruction sets and subroutines of server-side tracking indication process 12, which may be stored on storage device 26 coupled to server computer 22, may be executed by one or more processors (not shown) and one or more memory architectures (not shown) incorporated into server computer 22. Storage device 26 may include but is not limited to: a hard disk drive; a tape drive; an optical drive; a RAID array; a random access memory (RAM); and a read-only memory (ROM).

Server computer 22 may execute a web server application, examples of which may include but are not limited to: Microsoft IIS™, Novell Webserver™, or Apache Webserver™, that allows for access to server computer 22 (via network 24) using one or more protocols, examples of which may include but are not limited to HTTP (i.e., HyperText Transfer Protocol), SIP (i.e., session initiation protocol), and the Lotus Sametime™ VP protocol. Network 24 may be connected to one or more secondary networks (e.g., network 28), examples of which may include but are not limited to: a local area network; a wide area network; or an intranet, for example.

Client-side tracking indication processes 14, 16, 18, 20 may reside on and may be executed by client electronic devices 30, 32, 34, 36 (respectively), examples of which may include but are not limited to personal computer 30, laptop computer 32, personal digital assistant 34, notebook computer 36, a data-enabled, cellular telephone (not shown), and a dedicated network device (not shown), for example. Client electronic devices 30, 32, 34, 36 may each be coupled to network 24 and/or network 28 and may each execute an operating system, examples of which may include but are not limited to Microsoft Windows™, Microsoft Windows CE™, Redhat Linux™, or a custom operating system.

The instruction sets and subroutines of client-side tracking indication processes 14, 16, 18, 20, which may be stored on storage devices 38, 40, 42, 44 (respectively) coupled to client electronic devices 30, 32, 34, 36 (respectively), may be executed by one or more processors (not shown) and one or more memory architectures (not shown) incorporated into client electronic devices 30, 32, 34, 36 (respectively). Storage devices 38, 40, 42, 44 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Examples of client-side tracking indication processes 14, 16, 18, 20 may include but are not limited to a process incorporated into and executed within a client-side instant messaging application (e.g., Microsoft IM™ and Lotus Sametime™), which allows for instant-message based communication between a plurality of users (e.g., users 48, 50). Examples of server-side tracking indication process 12 may include a process incorporated into and executed within a server-side instant messaging application (e.g., Microsoft IM Server™ and Lotus Sametime Server™) Alternatively, client-side tracking indication processes 14, 16, 18, 20 and/or server-side tracking indication process 12 may be stand-alone applications that work in conjunction with (i.e., interface with) a client-side instant messaging application and/or a server-side instant messaging application (respectively). One or more of client-side tracking indication processes 14, 16, 18, 20 and server-side tracking indication process 12 may interface with each other (via network 24 and/or network 28) to allow a plurality of users (e.g., users 48, 50) to transmit instant messages to each other.

Users 46, 48, 50, 52 may access server-side tracking indication process 12 directly through the device on which the client-side tracking indication process (e.g., client-side tracking indication processes 14, 16, 18, 20) is executed, namely client electronic devices 30, 32, 34, 36, for example. Users 46, 48, 50, 52 may access server-side tracking indication process 12 directly through network 24 and/or through secondary network 28. Further, server computer 22 (i.e., the computer that executes server-side tracking indication process 12) may be connected to network 24 through secondary network 28, as illustrated with phantom link line 54.

The various client electronic devices may be directly or indirectly coupled to network 24 (or network 28). For example, personal computer 30 is shown directly coupled to network 24 via a hardwired network connection. Further, notebook computer 36 is shown directly coupled to network 28 via a hardwired network connection. Laptop computer 32 is shown wirelessly coupled to network 24 via wireless communication channel 56 established between laptop computer 32 and wireless access point (i.e., WAP) 58, which is shown directly coupled to network 24. WAP 58 may be, for example, an IEEE 802.11a, 802.11b, 802.11g, WiFi, and/or Bluetooth device that is capable of establishing wireless communication channel 56 between laptop computer 32 and WAP 58. Personal digital assistant 34 is shown wirelessly coupled to network 24 via wireless communication channel 60 established between personal digital assistant 34 and cellular network/bridge 62, which is shown directly coupled to network 24.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Tracking Indication Process:

For the following discussion, tracking indication process 10 shall be described generically and shall collectively refer to any and all combinations of server-side tracking indication process 12 and/or client-side tracking indication processes 14, 16, 18, 20. For illustrative purposes, assume that client-side tracking indication processes 14, 16, 18, 20 are processes incorporated into and executed within a client-side instant messaging application (e.g., Microsoft IM™ and Lotus Sametime™) that allow for communication with server-side tracking indication process 12. However, this is not intended to be a limitation of this disclosure, as other configurations are possible (e.g., stand-alone, client-side tracking indication processes and/or stand-alone server-side tracking indication processes.

Assume for illustrative purposes that users 46, 48, 50, 52 are all coworkers and that they each use an instant messaging system (e.g., Microsoft IM™ and Lotus Sametime™) to communicate. Further, assume that users 46, 48, 52 are logged into the instant messaging system and user 50 is not logged into the instant messaging system. Further, assume that user 46 (who is online) needs to "chat" with user 50 (who is offline).

Figure 3:
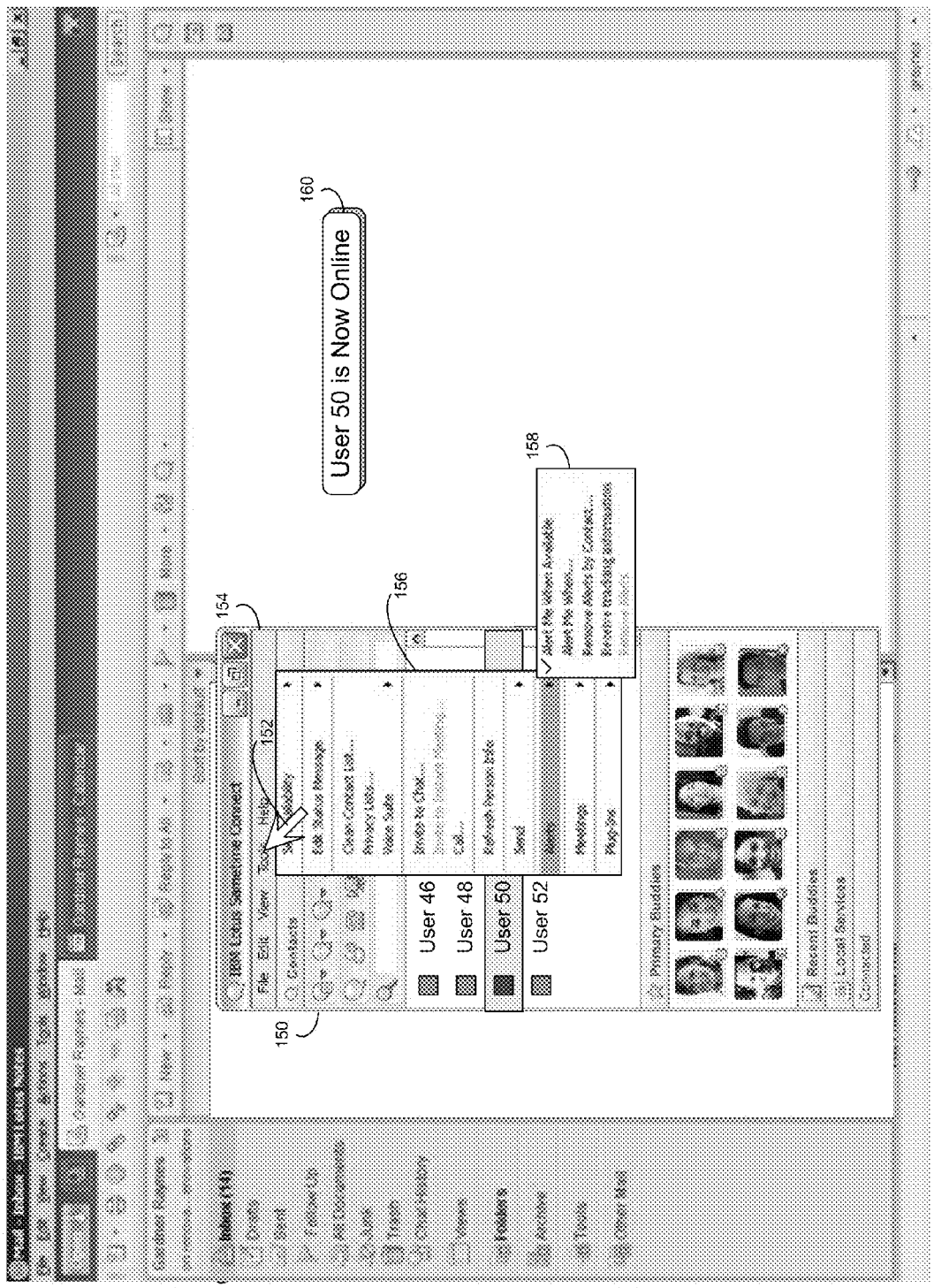
FIG. 3 is a diagrammatic view of a display screen rendered, at least in part, by the tracking indication process of FIG. 1.

Referring also to FIG. 3, since user 46 needs to talk to user 50, user 46 may initiate a tracking request (via user interface screen 150). Specifically, via onscreen pointer 152 that may be controllable by a pointing device such as a mouse (not shown), user 46 may select user 50 (resulting in e.g., "User 50" being highlighted). Once selected, user 46 may select "Tools" from menu bar 154, resulting in the rendering of tools menu 156 by tracking indication process 10 (alone or in combination with the above-described instant messaging system). Tools menu 156 may include a plurality of options, each of which may be selectable via onscreen pointer 152.

Assuming for illustrative purposes that user 46 selects the "Alerts" option from tools menu 156, alerts submenu 158 may be rendered by tracking indication process 10 (alone or in combination with the above-described instant messaging system). Alerts submenu 158 may include a plurality of options, each of which may be selectable via onscreen pointer 152. Examples of such options may include but are not limited to: "Alert Me When Available"; Alert Me When . . . "; "Remove Alerts by Contact . . . "; "Receive Tracking Information"; and "Remove Alerts". Accordingly, user 46 may select (via onscreen pointer 152) the option "Alert Me When Available"; which may result in a notification being provided to e.g., user 46 (e.g., as popup window 160 rendered on the display of desktop computer 30 and/or as an email message (not shown) being sent to user 46) whenever e.g., user 50 logs into the above-described instant messaging system.

Other options within alerts submenu 158 may allow user 46 to: be alerted when other situations occur concerning user 50 (e.g., using the "Alert Me When . . . " option); remove all alerts concerning user 50 (e.g., using the "Remove Alerts by Contact . . . " option); receive tracking information concerning who is tracking user 46 (e.g., using the "Receive Tracking Information" option); and remove all alerts concerning all users (e.g., using the "Remove Alerts" option).

Continuing with the above-stated example, when user 46 selects (via onscreen pointer 152) the option "Alert Me When Available", a tracking request may be processed 100 by tracking indication process 10 (alone or in combination with the above-described instant messaging system). When initiating the above-described tracking request, the requesting user (e.g., user 46) may be required to define why e.g., user 46 is requesting information concerning the online status of user 50.

Additionally, tracking indication process 10 (alone or in combination with the above-described instant messaging system) may maintain a maximum track count (as defined by e.g., an administrator) that may define the maximum number of users for which another user may submit a tracking request. Accordingly, prior to accepting a tracking request from e.g., user 46, the total number of tracking requests previously submitted by user 46 may be ascertained to determine 101 if accepting the current tracking request from user 46 (e.g., this particular tracking request concerning user 50) exceeds the maximum track count. If it is determined that accepting the current tracking request would exceed the maximum track count, the current tracking request may be ignored/discarded.

Upon processing 100 the above-described tracking request concerning user 50, tracking indication process 10 (alone or in combination with the above-described instant messaging system) may monitor 102 the online status of user 50. Specifically and as discussed above, whenever user 50 logs onto the above-described instant messaging system, user 46 may be provided with an online status notification (e.g., popup window 160 rendered on the display of desktop computer 30 and/or an email message sent to user 46), thus allowing user 46 to immediately contact user 50 (as user 46 knows that user 50 is available).

When user 46 selects to monitor 102 the online status of user 50, the user requesting the monitoring (e.g., user 46) may be required to select 106 a time period for monitoring the status of user 50. Specifically, by requiring user 46 to select 106 a finite period of time (e.g., one day, one week, one month), system loading may be avoided by minimizing the use of perpetual monitors. However, at the expiry of the selected monitoring period, tracking indication process 10 (alone or in combination with the above-described instant messaging system) may allow e.g., user 46 to renew their selection (thus allowing the monitoring 102 to occur for an additional defined period of time).

Figure 4:
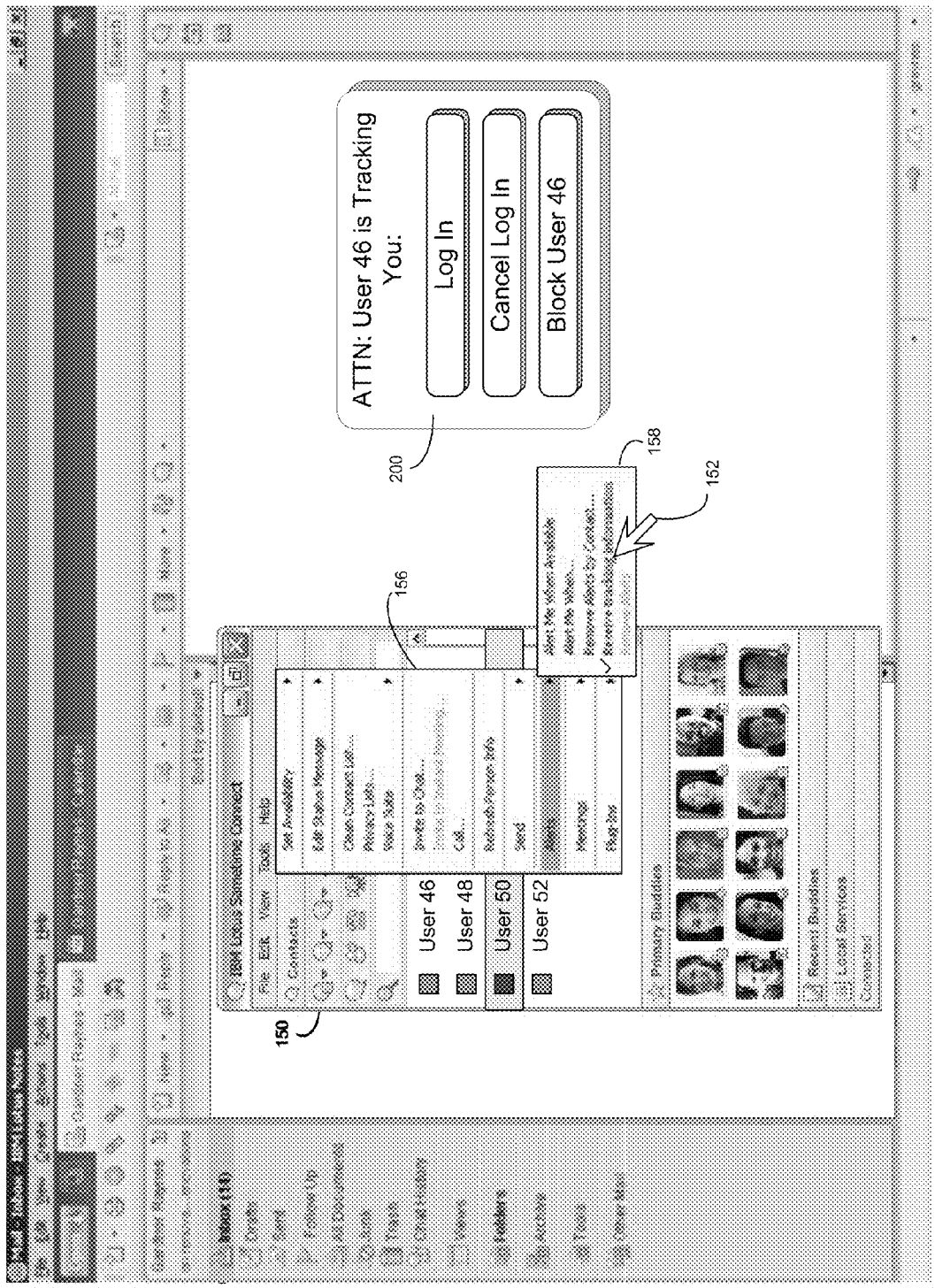
FIG. 4 is a diagrammatic view of a display screen rendered, at least in part, by the tracking indication system of FIG. 1.

Referring also to FIG. 4 and continuing with the above-stated example, assume that user 50 is a very popular person and, therefore, whenever user 50 logs into the above-described instant messaging system, user 50 is inundated with instant messages from various people. Accordingly, a user (e.g., user 50) may select (from alerts submenu 158) the "Receive Tracking Information" option using onscreen pointer 152.

Assuming that user 48 selects the "Receive Tracking Information" option from alerts submenu 158, upon user 50 attempting to log into the above-described instant messaging system, tracking indication process 10 (alone or in combination with the above-described instant messaging system) may provide 104 user 50 with a tracking notice, wherein the tracking notice may inform user 50 that (in this example) user 46 is monitoring their online status. The tracking notice provided 104 by tracking indication process 10 (alone or in combination with the above-described instant messaging system) may be in the form of a notice popup window 200. Alternatively, the tracking notice provided 104 by tracking indication process 10 (alone or in combination with the above-described instant messaging system) may be in the form of an email message (not shown) that is sent to user 50.

When providing 104 the tracking notice to user 50, the tracking notice may be provided 108 to e.g., user 50 prior to user 50 logging into the above-described instant messaging system. Specifically, by providing 108 the tracking notice to e.g., user 50 prior to user 50 logging into the above-described instant messaging system, user 50 may be able to take an action that avoids/prevents tracking indication process 10 (alone or in combination with the above-described instant messaging system) from providing 110 user 46 with information concerning the online status of e.g., user 50.

Continuing with the above-stated example in which notice popup window 200 is rendered by tracking indication process 10 (alone or in combination with the above-described instant messaging system), notice popup window 200 may define a plurality of options, examples of which may include but are not limited to: "Log In"; "Cancel Log In"; and "Block User 46", each of which may be selectable by user 50 via onscreen pointing device 152.

In the event that user 50 selects the "Log In" option using onscreen pointing device 152, user 50 may be logged into the above-described instant messaging system and tracking indication process 10 (alone or in combination with the above-described instant messaging system) may provide 110 user 46 with an online status notification (e.g., popup window 160 rendered on the display of desktop computer 30 and/or an email message (not shown) sent to user 46) informing user 46 that user 50 has logged into the above-described instant messaging system. Accordingly, user 46 may immediately contact user 50 (as user 46 knows that user 50 is available). The information concerning the online status of user 50 that is provided to user 46 may include various pieces of information, examples of which may include but are not limited to: log in notifications; and log out notifications.

However, if user 50 does not want user 46 to receive information concerning the online status of user 50, user 50 may select the "Cancel Log In" option using onscreen pointing device 152, resulting in user 50 not being logged into the above-described instant messaging system. Accordingly, an online status notification (e.g., popup window 160) will not be provided to user 46, as user 50 will not be logged into the above-described instant messaging system.

Concerning the third option included within notice popup window 200, if 114 user 50 selects "Block User 46" with onscreen pointing device 152, user 50 may log into the above-described instant messaging system and may prohibit 112 user 46 from receiving information concerning the online status of user 50. Accordingly, an online status notification (e.g., popup window 160) will not be provided to user 46, even though user 50 will be logged into the above-described instant messaging system.

Processing 100 a tracking request from a user (e.g., user 46) of the above-described instant messaging system may include determining 116 a first hierarchical rating for e.g., user 46 and a second hierarchical rating for e.g., user 50. Further, monitoring 102 the online status of a user may include monitoring 118 the online status of e.g., user 50 based, at least in part, upon the first and second hierarchical ratings. Specifically, a lower-ranking individual within a corporation may not be allowed to monitor the online status of a higher ranking individual within the corporation. Accordingly, if user 46 is a programmer and user 50 is a programming manager, user 46 may be prohibited from monitoring 102 the online status of user 50. However, user 50 may not be prohibited from monitoring the online status of user 46.

Tracking indication process 10 (alone or in combination with the above-described instant messaging system) may include functionality that stores tracking information for users that are offline for extended periods of time. Specifically, assume that user 50 is traveling extensively and has been unable to check their email for several weeks. Further, assume that during that time, eight different users (including user 46) submitted tracking requests concerning user 50. Accordingly, upon user 50 logging into the above-described instant messaging system, tracking indication process 10 (alone or in combination with the above-described instant messaging system) may provide user 50 with a detailed chronology concerning who e.g., submitted tracking requests concerning user 50.

While the system is described above as determining 116 hierarchical ratings for each user and monitoring 118 the online status based upon the hierarchical ratings, this is for illustrative purposes only and is not intended to be a limitation of this disclosure, as other configurations are possible. For example, decisions concerning whether to allow monitoring 102 of online status may be based upon inclusion within a social network community or (more specifically) inclusion within a specific group/subgroup of a social networking community.

Additionally, the ability to monitor 102 online status may be based upon corporate policies/rules. For example, an executive may monitor all people within their organization. Further, people who report directly to the executive may be able to do the same. Further still and assuming that the corporate policy allows, the capability to monitor 102 online statuses may be pushed down to various groups/subgroups within the organization, examples of which may include but are not limited to: teams, projects, geographies, time zones, divisions, subdivisions, partners, territories, and related entities. For example, for one project within the organization, a group/individual may have the ability to monitor 102 online status. However, the same group/individual may not have the ability to monitor the online status of another project.

Tracking indication process 10 (alone or in combination with the above-described instant messaging system) may provide 120 a periodic tracking report to users that identifies the users of the above-described instant messaging system that submitted tracking requests concerning the user. These reports may be limited to a defined period of time. For example, every month, user 50 may be provided 120 with a tracking report that defines the users of the above-described instant messaging system who submitted tracking requests concerning user 50.

While system 10 is described above as including a high level of functionality, this is for illustrative purposes only and is not intended to be a limitation of this disclosure, as other configurations are possible and are considered to be within the scope of this disclosure. For example, it is foreseeable that the various users of system 10 may use different instant messaging systems, which may operate on different networks that may communicate via one or more gateways (not shown). Accordingly, a portion of the above-described functionality may not be available to one or more of the above-described users if one or more of the instant messaging systems and/or the gateways does not support the functionality. In the event that one or more pieces of functionality are not supported, the users may be alerted when such functionality is not available. Alternatively, the requested functionality may simply not be available.

A number of implementations have been described. Nevertheless, it will be understood that various modifications may be made. Accordingly, other implementations are within the scope of the following claims.

What is claimed is:

1. A method comprising:
processing a tracking request from a first user of an instant messaging system concerning the online status of a second user of the instant messaging system;
monitoring the online status of the second user;
providing a tracking notice to the second user prior to the second user logging into the instant messaging system, wherein the tracking notice informs the second user that the first user is monitoring the online status of the second user; and
providing a periodic tracking report to the second user, wherein the periodic tracking report identifies one or more users of the instant messaging system who submitted tracking requests concerning the second user during a defined period of time.

2. The method of claim 1 further comprising:
allowing the second user to prohibit the first user from receiving information concerning the online status of the second user.

3. The method of claim 2 further comprising:
if the second user does not prohibit the first user from receiving information concerning the online status of the second user, providing the first user with information concerning the online status of the second user.

4. The method of claim 3 wherein the information concerning the online status of the second user includes one or more of: log in notifications; and log out notifications.

5. The method of claim 1 wherein monitoring the online status of the second user includes:
monitoring the online status of the second user for a defined period of time based upon one or more configuration settings.

6. The method of claim 1 wherein:
processing the tracking request from the first user of the instant messaging system includes determining a first hierarchical rating for the first user and a second hierarchical rating for the second user; and
monitoring the online status of the second user includes monitoring the online status of the second user based, at least in part, upon the first and second hierarchical ratings.

7. The method of claim 1 wherein the tracking request defines why the first user is requesting information concerning the online status of the second user.

8. The method of claim 1 further comprising:
defining a maximum track count that defines the maximum number of users for which the first user may submit a tracking request.

9. A computer program product residing on a non-transitory computer readable medium having a plurality of instructions stored thereon, which, when executed by a processor, cause the processor to perform operations comprising:
processing a tracking request from a first user of an instant messaging system concerning the online status of a second user of the instant messaging system;
monitoring the online status of the second user;
providing a tracking notice to the second user prior to the second user logging into the instant messaging system, wherein the tracking notice informs the second user that the first user is monitoring the online status of the second user; and
providing a periodic tracking report to the second user, wherein the periodic tracking report identifies one or more users of the instant messaging system who submitted tracking requests concerning the second user during a defined period of time.

10. The computer program product of claim 9 further comprising instructions for:
allowing the second user to prohibit the first user from receiving information concerning the online status of the second user.

11. The computer program product of claim 10 further comprising instructions for:
if the second user does not prohibit the first user from receiving information concerning the online status of the second user, providing the first user with information concerning the online status of the second user.

12. The computer program product of claim 11 wherein the information concerning the online status of the second user includes one or more of: log in notifications; and log out notifications.

13. The computer program product of claim 9 wherein the instructions for monitoring the online status of the second user include instructions for:
monitoring the online status of the second user for a defined period of time based upon one or more configuration settings.

14. The computer program product of claim 9 wherein:
the instructions for processing the tracking request from the first user of the instant messaging system include instructions for determining a first hierarchical rating for the first user and a second hierarchical rating for the second user; and
the instructions for monitoring the online status of the second user include instructions for monitoring the online status of the second user based, at least in part, upon the first and second hierarchical ratings.

15. The computer program product of claim 9 wherein the tracking request defines why the first user is requesting information concerning the online status of the second user.

16. The computer program product of claim 9 further comprising instructions for:
defining a maximum track count that defines the maximum number of users for which the first user may submit a tracking request.

* * * * *